United States Patent
Trivedi et al.

(10) Patent No.: US 10,731,762 B2
(45) Date of Patent: Aug. 4, 2020

(54) TEMPERATURE ACTIVATED ELASTOMERIC SEALING DEVICE

(71) Applicant: GENERAL ELECTRIC COMPANY, Schenectady, NY (US)

(72) Inventors: Deepak Trivedi, Halfmoon, NY (US); Chad Eric Yates, Houston, TX (US); Binoy Milan Shah, Niskayuna, NY (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 768 days.

(21) Appl. No.: 14/942,168

(22) Filed: Nov. 16, 2015

(65) Prior Publication Data

US 2017/0138147 A1    May 18, 2017

(51) Int. Cl.
| | |
|---|---|
| F16J 15/46 | (2006.01) |
| F16J 15/16 | (2006.01) |
| F16J 15/02 | (2006.01) |
| F16J 15/06 | (2006.01) |
| F16J 15/48 | (2006.01) |
| E21B 33/06 | (2006.01) |
| E21B 33/12 | (2006.01) |

(52) U.S. Cl.
CPC ............. *F16J 15/46* (2013.01); *F16J 15/027* (2013.01); *F16J 15/068* (2013.01); *F16J 15/164* (2013.01); *E21B 33/06* (2013.01); *E21B 33/12* (2013.01); *F16J 15/48* (2013.01)

(58) Field of Classification Search
CPC .. F16J 15/027; F16J 15/14; F16J 15/46; F16J 15/068

USPC ......................................... 277/605, 646, 933
See application file for complete search history.

(56) References Cited

U.S. PATENT DOCUMENTS

| | | | | | |
|---|---|---|---|---|---|
| 829,546 | A | * | 8/1906 | Schou ...................... | F16J 15/22 |
| | | | | | 277/538 |
| 1,439,452 | A | * | 12/1922 | Shaw ....................... | F16J 15/46 |
| | | | | | 277/646 |
| 1,966,202 | A | * | 7/1934 | Pfefferle ................. | F16L 21/04 |
| | | | | | 165/178 |

(Continued)

FOREIGN PATENT DOCUMENTS

| | | |
|---|---|---|
| EP | 1428975 B1 | 12/2005 |
| EP | 1978071 B1 | 7/2010 |

(Continued)

OTHER PUBLICATIONS

Milberger, et al; "Evolution of Metal Seal Principles and Their Application in Subsea Drilling and Production," Offshore Technology Conference, May 4, 1992.

(Continued)

*Primary Examiner* — Nicholas L Foster
(74) *Attorney, Agent, or Firm* — Hogan Lovells US LLP

(57) ABSTRACT

An elastomeric sealing device operable at an operating temperature above an installation temperature. The sealing device includes a body fabricated from an elastomeric material. A channel is formed within the body. A mesh is disposed within the channel. The mesh includes a plurality of interwoven fibers forming an inner volume. A filler is disposed within the inner volume. At least a portion of the filler is a liquid at the installation temperature. The at least a portion of the filler is a gas at the operating temperature.

23 Claims, 4 Drawing Sheets

(56) References Cited

U.S. PATENT DOCUMENTS

| | | | |
|---|---|---|---|
| 3,178,779 A * | 4/1965 | Clark | B64C 1/14 220/232 |
| 3,359,687 A * | 12/1967 | Wallace | B64D 13/04 49/477.1 |
| 3,642,291 A * | 2/1972 | Zeffer | F16J 15/46 277/583 |
| 3,788,651 A * | 1/1974 | Brown | F16J 15/46 220/232 |
| 3,934,889 A * | 1/1976 | Smith | F02C 7/25 277/646 |
| 4,078,832 A | 3/1978 | Wittman | |
| 4,269,419 A * | 5/1981 | Brant | F16L 21/03 277/605 |
| 4,300,775 A * | 11/1981 | Ringel | F16J 15/3224 277/589 |
| 5,580,068 A * | 12/1996 | Gundy | F16J 15/022 277/605 |
| 6,820,666 B2 | 11/2004 | Nahmias Nanni et al. | |
| 6,896,063 B2 | 5/2005 | Chang et al. | |
| 7,188,678 B2 | 3/2007 | Richard et al. | |
| 7,617,874 B2 | 11/2009 | Ocalan | |
| 7,743,825 B2 | 6/2010 | O'Malley et al. | |
| 7,857,066 B2 | 12/2010 | DiFoggio et al. | |
| 8,240,392 B2 | 8/2012 | Barnard et al. | |
| 8,276,918 B1 * | 10/2012 | Gilstad | F04B 1/0448 277/530 |
| 8,397,836 B2 | 3/2013 | Pool et al. | |
| 8,403,337 B1 * | 3/2013 | Gilstad | F04B 53/02 277/567 |
| 8,439,082 B2 | 5/2013 | O'Connell | |
| 8,443,892 B2 | 5/2013 | Richard et al. | |
| 8,464,787 B2 | 6/2013 | O'Malley | |
| 8,602,419 B2 | 12/2013 | Namuduri et al. | |
| 8,616,276 B2 | 12/2013 | Tips et al. | |
| 8,646,537 B2 | 2/2014 | Tips et al. | |
| 8,684,100 B2 | 4/2014 | Tingler et al. | |
| 8,739,408 B2 | 6/2014 | Duan et al. | |
| 8,794,639 B2 * | 8/2014 | Westhoff | E03F 3/04 277/605 |
| 8,955,606 B2 | 2/2015 | O'Malley | |
| 8,960,314 B2 | 2/2015 | Ramon et al. | |
| 10,029,550 B2 * | 7/2018 | Richert | B60J 10/35 |
| 2002/0063398 A1 | 5/2002 | Norman-Martin | F16J 15/46 277/646 |
| 2005/0077683 A1 * | 4/2005 | Comert | B60R 13/06 277/300 |
| 2005/0187331 A1 * | 8/2005 | Yuan | C08K 3/04 524/462 |
| 2006/0272826 A1 | 12/2006 | Shuster et al. | |
| 2007/0193736 A1 * | 8/2007 | Corre | E21B 33/1277 166/187 |
| 2008/0264647 A1 | 10/2008 | Li | |
| 2010/0310385 A1 | 12/2010 | Denne | |
| 2011/0293958 A1 * | 12/2011 | Benkoski | C08G 18/3228 428/560 |
| 2012/0025471 A1 * | 2/2012 | Andrick | E03F 3/04 277/314 |
| 2012/0055667 A1 | 3/2012 | Ingram et al. | |
| 2012/0139250 A1 | 6/2012 | Inman et al. | |
| 2012/0205105 A1 | 8/2012 | Le Roy-Delage et al. | |
| 2012/0205106 A1 | 8/2012 | Le Roy-Delage et al. | |
| 2012/0218903 A1 | 8/2012 | Baldemair et al. | |
| 2013/0037267 A1 | 2/2013 | Regnault De La Mothe et al. | |
| 2013/0048127 A1 | 2/2013 | Bosworth et al. | |
| 2013/0062061 A1 | 3/2013 | Taylor et al. | |
| 2013/0087333 A1 | 4/2013 | Seth et al. | |
| 2013/0126170 A1 | 5/2013 | Johnson et al. | |
| 2013/0140043 A1 | 6/2013 | Swanson et al. | |
| 2013/0146286 A1 | 6/2013 | Le Roy-Delage et al. | |
| 2014/0020910 A1 | 1/2014 | Falkner et al. | |
| 2014/0027129 A1 | 1/2014 | Hannegan et al. | |
| 2014/0054043 A1 | 2/2014 | O'Malley | |
| 2014/0154497 A1 * | 6/2014 | Yokota | F16J 15/102 428/314.4 |
| 2015/0115535 A1 | 4/2015 | Trivedi et al. | |
| 2015/0218903 A1 | 8/2015 | Sellers, Jr. et al. | |
| 2016/0069482 A1 * | 3/2016 | Giladi | F16J 15/06 277/646 |
| 2016/0368355 A1 * | 12/2016 | Richert | B60J 10/35 |
| 2016/0369436 A1 * | 12/2016 | Stewart | F16J 15/027 |

FOREIGN PATENT DOCUMENTS

| | | |
|---|---|---|
| WO | 9403743 A1 | 2/1994 |
| WO | 2006102171 A2 | 9/2006 |
| WO | 2010120419 A1 | 10/2010 |
| WO | 2011133369 A1 | 10/2011 |
| WO | 2011147021 A1 | 12/2011 |
| WO | 2012003196 A2 | 1/2012 |
| WO | 2012094488 A3 | 10/2012 |
| WO | 2013039774 A1 | 3/2013 |
| WO | 2013139601 A2 | 9/2013 |

OTHER PUBLICATIONS

Ayers, et al; "Effects of Thermal Cycling on Offshore Pipeline Repair Tool Seal Systems," Offshore Technology Conference, Apr. 30-May 3, 2012.

Hitchcook et al., "The Mechanical Response and Anti-Extrusion Characteristics of Fibre-Filled Elastomers", Journal of Materials:Design and Applications, Volume No. 213, Issue No. 1, pp. 37-46, Jan. 1, 1999.

PCT Search Report and Written Opinion issued in connection with corresponding PCT Application No. PCT/US16/060509 dated Feb. 21, 2017.

* cited by examiner

TEMPERATURE ACTIVATED ELASTOMERIC SEALING DEVICE

TECHNICAL FIELD

The present description relates generally to seals. More specifically, the present invention relates to elastomeric seals that are temperature activated.

BACKGROUND

Conventional sealing devices (seals) are generally utilized to create sealed junctions between mating components that prevent the passage of liquid or gaseous fluids, such as air, water, refrigerants and the like, through the junction under certain operating temperatures and pressures. Seals are typically fabricated from one or more elastomers, such as thermoplastic elastomers, various rubbers or the like, that are compatible with the environmental conditions they will be subjected to at those operating temperatures and pressures.

However, conventional seals typically have a fixed modulus of elasticity ("Young's modulus" or "modulus") which must be suitable for the operating conditions of a given application. The fixed modulus can be problematic, especially for seals having operating pressure and temperatures that are substantially higher than the pressures and temperatures the seals are subjected to during installation (i.e., installation temperatures and pressures) of the seal in the junction between the mating components. For high operating pressures, a seal will usually require a high modulus and will generally be very stiff and difficult to work with during installation. Additionally for such high pressures, the seals must be installed with an interference fit between components, which could potentially damage the seal upon installation. Moreover, if a seal is additionally subjected to high operating temperatures, the seal's elastomeric body will have a tendency to soften, which could lead to extrusion under high operating pressures that could also damage the seal or cause the seal to leak.

Accordingly, there is a need for an elastomeric sealing device for high pressure-high temperature applications, which is easy to install and does not require an interference fit at installation temperatures and pressures.

SUMMARY

Aspects of the present invention, which provide temperature activated elastomeric sealing devices that overcome the limitations of conventional sealing devices, are disclosed. Though some aspects of the present description may be directed toward the fabrication of components for the oil and gas industry, aspects of the present invention may be employed in the fabrication of any component on any industry, in particular, those components requiring high temperature-high pressure sealing applications.

The present invention offers advantages and alternatives over the prior art by providing an elastomeric sealing device operable at an operating temperature above an installation temperature. The sealing device includes a body fabricated from an elastomeric material and a channel formed within the body. A mesh is disposed within the channel. The mesh including a plurality of interwoven fibers forming an inner volume. A filler is disposed within the inner volume, wherein at least a portion of the filler is a liquid at the installation temperature, and wherein the at least a portion of the filler is a gas at the operating temperature. In some embodiments the sealing device has an operating pressure and an installation pressure wherein the at least a portion of the filler is a liquid at the installation pressure, and the at least a portion of the filler is a gas at the operating pressure.

In some embodiments the elastomeric sealing device operates within a temperature range of 65 to 260 degrees C. In other embodiments the sealing device operate within a pressure range of 100 pounds per square inch (psi) to 30,000 psi. In other embodiments the sealing device has an installation temperature within a range of 0 degrees centigrade to 25 degrees centigrade. In other embodiments the installation pressure is substantially equal to the operating pressure.

In another aspect of the invention, the elastomeric sealing device includes an inner liner disposed between the filler and mesh.

In other embodiments, the mesh of the elastomeric sealing includes a first group of fibers arranged at a first angle with respect to a longitudinal axis of the mesh. Additionally, the mesh includes a second group of fibers arranged at a second angle with respect to the longitudinal axis of the mesh, wherein the second angle is substantially opposite and substantially equal to the first angle. In some embodiments the first angle is within a range of 50 to 60 degrees. In other aspects of the invention, the fibers of the mesh are substantially inextensible.

In some embodiments the elastomeric material of the body of the sealing device is a polymer. In some aspects of the invention, the elastomeric material is a rubber. In other embodiments, the inner liner of the sealing device is an elastomeric material.

In some embodiments the sealing device may have an annular shape. In other embodiments the invention, the sealing device may be used as an o-ring.

In yet another embodiment of the invention, the elastomeric sealing device's body includes an arcuate shaped portion having a first end and a second end, a first flange integrally connected to the first end and a second flange integrally connected to the second end. In other embodiments the elastomeric sealing device is a packer element for one of a zonal isolation device and a blow-out preventer.

In other embodiments of the invention, the elastomeric sealing device includes a first effective modulus attributable to the elastomeric sealing devices at the installation temperature and the installation pressure. The device also includes a second effective modulus attributable to the elastomeric sealing device at the operating pressure and operating temperature, wherein the second effective modulus is larger magnitude than the first effective modulus. In some embodiments, the second effective modulus is between 2 to 3 orders of magnitude greater than the first effective modulus.

In some embodiments, the filler of the elastomeric sealing device is composed of thermally expandable microspheres.

These and other aspects, features, and advantages of this invention will become apparent from the following detailed description of the various aspects of the present invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the present invention will be readily understood from the following detailed description of aspects of the invention taken in conjunction with the accompanying drawings in which:

DETAILED DESCRIPTION

Figure 1:
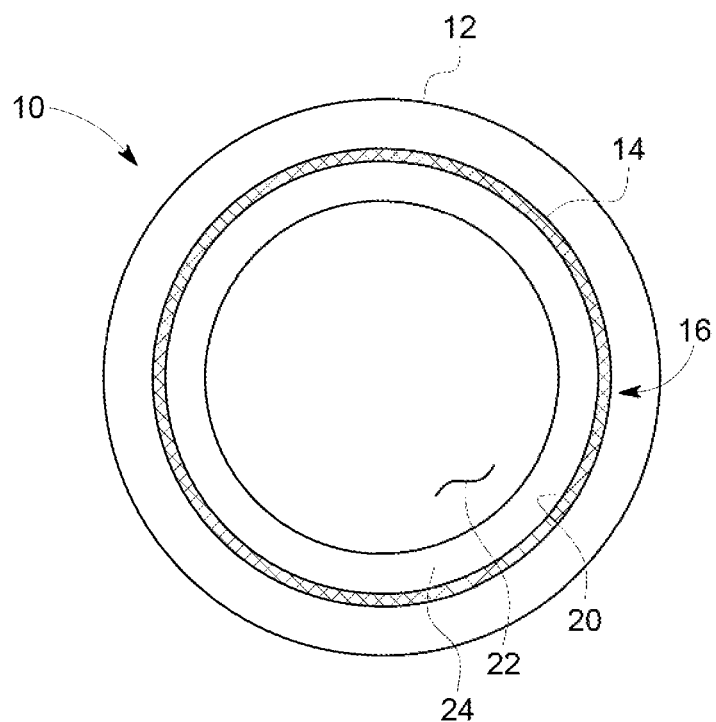
FIG. 1 is a cross sectional view of an exemplary embodiment of a temperature activated elastomeric sealing device in accordance with the present invention.

Certain exemplary embodiments of the present invention will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

U.S. patent application Ser. No. 14/068,773, filed on Oct. 31, 2013, having Publication No. US2015/0115535 A1 and titled "Seal Having Variable Elastic Modulus" to inventors Trivedi et al (the Trivedi application) describes a prior art seal having a variable modulus. The seal described in Trivedi includes a body fabricated from an elastomeric material. A channel is formed within the body and a tube is disposed within the channel. The tube is comprised of a plurality of interwoven fibers. Trivedi also includes an inlet in an outer surface of the body, wherein the inlet is fluidly coupled to an inner volume of the tube.

The Trivedi seal requires a source of high pressure fluid, such as a high pressure pump, a pressurized accumulator or the like, to pump pressurized fluid through the inlet and into the inner volume of the tube in order to vary the effective modulus of the seal. Additionally, a valve must be used to contain the fluid under pressure and control the seal's modulus. The Trivedi seal must be perforated to accommodate the inlet, which could potentially damage the seal. Moreover, the need for a valve and a source of high pressure fluid can be expensive and adds to the complexity of the installation process.

Accordingly, there is a need for an elastomeric sealing device with a variable modulus that does not require external apparatus, such as high pressure pumps or valves, to activate.

FIGS. 1-7 illustrate various exemplary embodiments of a temperature activated elastomeric sealing device 10 in accordance with the present invention. Sealing device 10 has a low modulus of elasticity at installation temperature and pressure, allowing for ease of installation. Additionally, there is typically no requirement for an interference fit during installation, which reduces the potential for damage during the installation process and increases the sealing device's reliability. The sealing device 10 modulates to a higher modulus of elasticity at operating temperatures and pressures, which makes the sealing device stiffen in place and grow in dimension to provide an effective seal. No interface with an external apparatus is required to change the modulus of sealing device 10 as it transitions from installation temperatures to operating temperatures.

Figure 2:
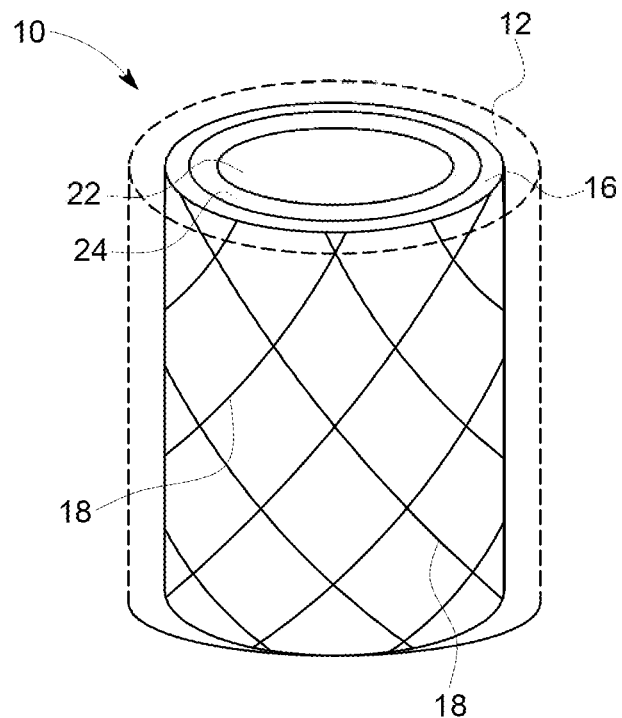
FIG. 2 is a perspective view of a longitudinal portion of the sealing device of FIG. 1.

Referring to FIG. 1, a cross sectional view of an exemplary embodiment of a temperature activated elastomeric sealing device 10 in accordance with the present invention is presented. Referring to FIG. 2, a perspective view of a longitudinal portion of the sealing device 10 of FIG. 1 is also presented. Sealing device 10 includes an elastomeric body 12, which is shown in cross section in FIG. 1 and in phantom in FIG. 2. Body 12 has a generally annular shaped cross section and forms the outer circumferential layer of sealing device 10. Sealing device 10 also includes a channel 14 defined by the inner circumferential boundary of the body 12 and a mesh 16 disposed within the channel 14. Mesh 16 includes a plurality of inelastic interwoven fibers 18 (best seen in FIG. 2). The inner circumferential boundary of mesh 16 defines an inner volume 20. A filler 22 is disposed within the center of inner volume 20. Additionally an optional inner liner 24 may be positioned along the circumferential boundary of the inner volume 20 such that inner liner 24 is located between the filler 22 and mesh 16.

At least a portion of the filler 22 is a liquid at installation temperatures and pressures, which are generally at, or near, the standard atmospheric temperature of 25 degrees C. and the standard atmospheric pressure of one atmosphere (or 14.7 psi). However, one skilled in the art would recognize that installation temperature or pressure may vary substantially from such standard atmospheric temperature and pressure. For example, the installation temperature could be within a range of 0 degrees C. to 50 degrees C.

At such installation temperatures and pressures the interwoven fibers 18 of mesh 16 are flexible and pliable. Accordingly, sealing device 10 has an effective first modulus of elasticity that is relatively low at installation conditions.

At elevated operating temperatures, the portion of the filler 22 that is a liquid at installation temperatures and pressures changes phase from a liquid to a gas and pressurizes the interwoven fibers 18 of sealing device 10. The interwoven fibers 18 come under tension when pressurized by the vaporized portion of the filler 22, which causes the mesh 16 to expand radially and, due to the inelastic properties of the fibers 18, to contract longitudinally. This substantially increases the effective modulus of the sealing device 10 from the first modulus to a much higher second modulus of elasticity. In some cases the second modulus is up to 2 to 3 orders of magnitude greater than the first modulus. The increased stiffness of sealing device 10 compensates for any softening of the elastomeric body 12 due to elevated operating temperatures. Additionally, the radial expansion of mesh 16 causes an interference fit to be created, leading to an effective seal.

The filler can be composed of any number of low boiling liquids or gels, the gels having a substantial liquid component. In a preferred embodiment, the filler is composed of a large plurality of thermally expandable microspheres. Microspheres are commercially available and can be purchased from such companies as Chase Corporation in Westwood, Mass., USA or Kureha in Osaka, Japan.

Figure 3:
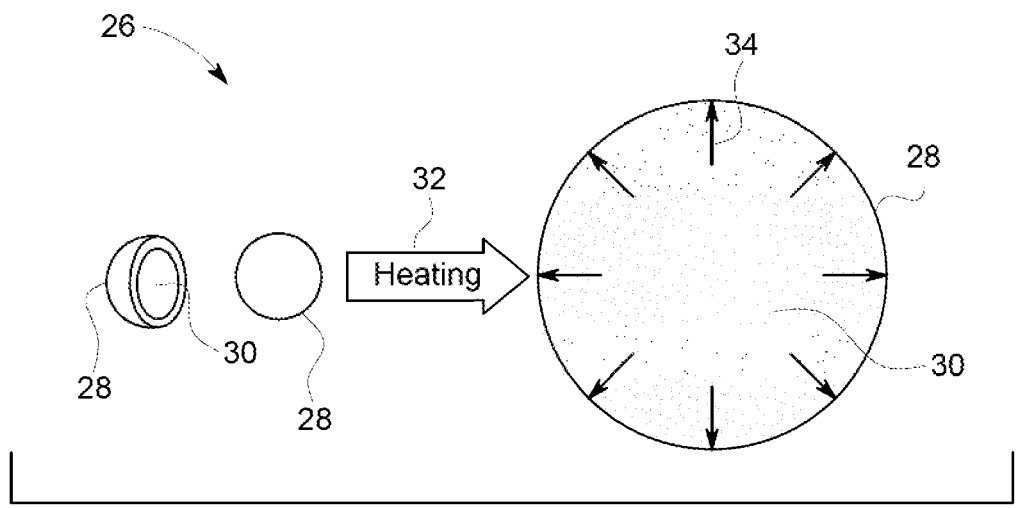
FIG. 3 is a perspective view of an exemplary embodiment of a thermally expandable microsphere used as a filler in the sealing device of FIG. 1.

Referring to FIG. 3, an exemplary embodiment of a thermally expandable microsphere is shown at 26. Microscopic sphere 26 includes a spherical microscopic thermoplastic shell 28 that can be composed of a thermoplastic polymer. Shell 28 encapsulates a low boiling point hydrocarbon 30, such as isobutane, isopentane, an aliphatic hydrocarbon or the like, which is a liquid at the installation temperatures and pressures.

When heat energy 32 is applied to microsphere 26, the shell 28 softens. Additionally the encapsulated hydrocarbon 30 changes state from a liquid to a gas, which exerts an outward pressure (shown by arrows 34) on the shell 28, causing expansion. The expanded diameter of microsphere 26 can increase by 3 to 5 times and the expanded volume of microsphere 26 can increase from 50 to 100 times over its unexpanded diameter and volume. A typical range of diameters for microsphere 26 can vary from 10 to 50 microns in the unexpanded state up to 30 to 200 microns in the expanded shape.

Microspheres 26 have a wide range of variable features that can be used to match a particular application's requirements, including the chemical composition of the shell 28 and encapsulated hydrocarbon 30, wall thickness of the shell 28, overall size of the microsphere 26 and the shape of the microsphere. Accordingly, as a main component of filler 22, the microspheres 26 can be designed to operate in such divers operating temperature ranges as from 65 degrees C. to 260 degrees C. and operating pressure ranges as from 100 psi to 30,000 psi.

Moreover, the filler 22 can be composed of more than one type of microspheres 26, each type being tuned to operate in a specific operating temperature and pressure to provide a stepped change in the effective modulus, and therefore stiffness, to sealing device 10 as the operating temperature increases. For example, there can be at least a first type of microsphere 26 and a second type of microsphere 26. The first type of microspheres selected to start its expansion within a first operating temperature range (for example 90 to 95 degrees C.) and the second type of microsphere selected to start its expansion within a second operating temperature range (for example 140-145 degrees C.), wherein the second operating temperature range is higher than the first operating temperature range. In this way, the stiffness of sealing device 10 can adjust in a step wise fashion to compensate for rising operating temperatures and the rising operating pressures that are associated with those higher operating temperatures.

A commercial example of two types of microspheres 26 that could potentially be combined together as part of the filler 22 for sealing device 10 to provide a stepped change in effective modulus and stiffness as operating temperatures rise would be Chase Corporation's microsphere part numbers U018-130D and U017-175D. The U018-130D microsphere has an expansion start temperature range of 90 to 95 degrees C. and an optimum expansion temperature range of 130 to 140 degrees C. The U017-175D microsphere has an expansion start temperature range of 140 to 145 degrees C. and an optimum expansion temperature range of 175-185 degrees C.

The body 12 may comprise any shape suitable to form a seal between components in a desired application and may be dependent on the size and/or shape of the components. For example, the body 12 may be substantially annular shaped (e.g., in applications where the seal 10 may be utilized as an o-ring). Alternatively, the body 12 may have an arcuate or substantially semicircular shape (e.g., in applications where the seal 10 may be utilized as a packer element for a zonal isolation device or blow out preventer (BOP), such as a fixed bore ram, annual packer, variable ram packer (Hydril), or the like), such as described below with respect to FIG. 6.

The body 10 may be fabricated from any elastomeric material that is compatible with process conditions of a desired application. For example, the body 12 may be fabricated from a polymer, such as a rubber compound, silicone or the like. In embodiments where the body 12 is fabricated from a rubber compound, the compound may be based on any suitable rubber compound, for example, such as nitrile butadiene rubber, natural rubber, or the like.

The channel 14 may be disposed in any position within the body 12 suitable to facilitate a phase change of at least a portion of the filler 22 and, therefore, a transition from the first modulus to the higher second modulus of the sealing device 10 throughout at least a portion of the sealing device 10. For example, in embodiments where the body 12 is substantially annular shaped, the channel 14 may also be annular in shape and disposed within the body 12 such that the channel 14 is concentric with the body 12, such as shown in FIGS. 1 and 2. Alternatively, in another embodiment, the channel 14 may be disposed within a portion of the body 12, such as described below with respect to FIG. 6. Although shown in the figures as a having a shape that is substantially similar to the body 12, it is to be understood that the channel 14 may be any shape suitable to provide a desired phase change of at least a portion of filler 22 throughout at least a portion of the sealing device 10 and may be independent of the overall shape of the body 12.

The fibers 18 of mesh 16 may be fabricated from any substantially inelastic material. For example, the fibers may be fabricated from a polymer based material, such as nylon, polyester, cotton, rayon or the like. The fibers may also be high performance carbon fibers.

The optional inner liner 24 functions to prevent leakage of the filler 22 through the mesh 16 and body 12, especially in embodiments where the mesh 16 is porous. In addition, the inner liner 24 may prevent exposure of the plurality of fibers 18 to the filler disposed within the inner volume 20, thereby preventing or reducing degradation of the plurality of fibers 18. The inner liner 24 may be fabricated from any elastomeric material that is compatible or non-reactive with the filler and may be dependent on a desired application. For example, the inner liner 24 may be fabricated from a polymer, such as a rubber compound, silicone or the like.

Figure 4:
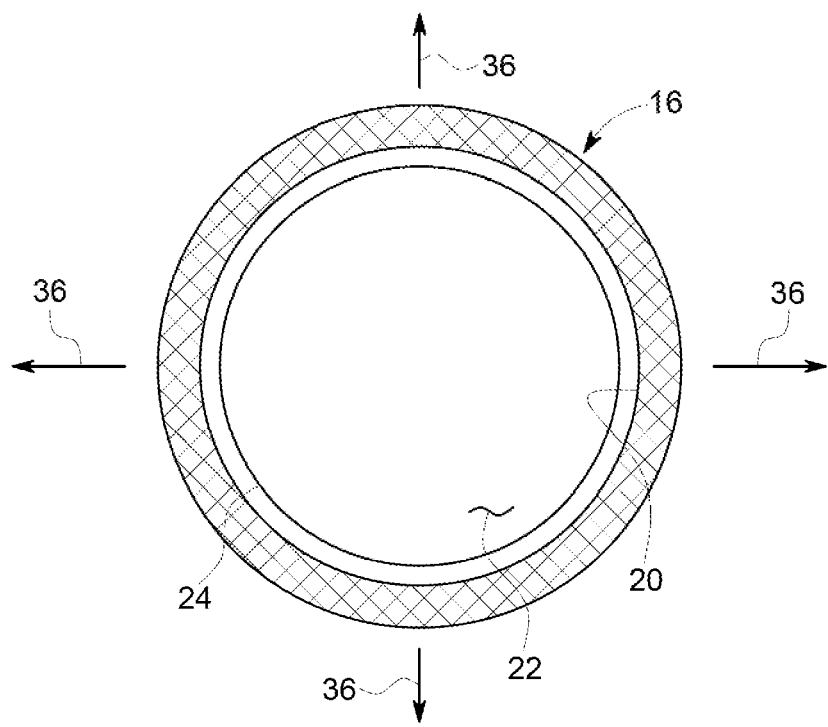
FIG. 4 is a cross sectional view of the mesh of the sealing device of FIG. 1.

Referring to FIG. 4, a cross sectional view of the mesh 16 of sealing device 10 of FIG. 1 is presented. The internal boundary of mesh 16 defines the inner volume 20 in which the inner liner 24 and filler 22 are concentrically disposed. In operation, as the temperatures and pressures increase toward their operating temperatures and pressures, at least a portion of the filler 22 changes phase from a liquid to a gas and pressurizes mesh 16. As the pressure within the inner volume 20 of the mesh 16 is increased, a radially outward pressure (indicated by arrows 46) is applied to the mesh 16, thereby causing mesh 16 to expand radially and, due to the inelastic properties of the plurality of fibers 18, decrease longitudinally.

Figure 5:
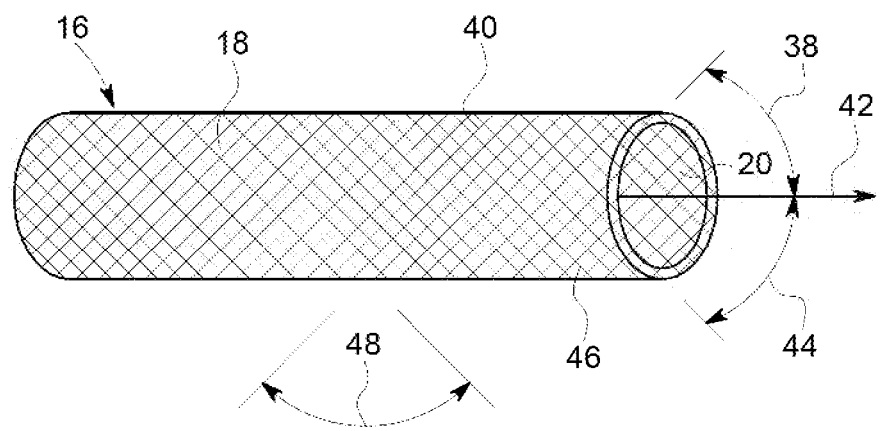
FIG. 5 is a perspective view of a longitudinal portion of the mesh of the sealing device of FIG. 1.

Referring to FIG. 5, a perspective view of a longitudinal portion of the mesh 16 of sealing device 10 of FIG. 1 is presented. As the pressure further increases, the plurality of fibers 18 interlock at a predetermined angle (i.e., the "weave angle") thus preventing a further radial expansion and longitudinal contraction of the mesh 16, thereby causing an increase in tension of the plurality of fibers 18. As the tension of the plurality of fibers 18 increases, the stiffness of the mesh 16, and therefore, the stiffness of the sealing device 10 increases.

The plurality of interwoven fibers 18 may be configured in any manner suitable to facilitate the increase or decrease in the elastic modulus of the seal as described above. In the exemplary embodiment of FIG. 4, the plurality of fibers 18 are arranged such that a first angle 48 of a first group of fibers 40 with respect to a longitudinal axis 42 of the mesh 16 is substantially equal and substantially opposite to a second angle 44 of a second group of fibers 46 with respect to the longitudinal axis 42 of the mesh 16. In addition, the plurality of interwoven fibers 18 may be arranged such that, upon pressurization of the inner volume 20 of the mesh 16, the first group of fibers 40 and the second group of fibers 46 interlock at a predetermined angle 48 with respect to one another (e.g., the "weave angle" discussed above). For example, in one embodiment, the first group of fibers 40 and the second group of fibers 46 may interlock at an angle 48 of about 50 degrees to about 60 degrees, or about 54° 44' upon pressurization of the mesh 16. The interlock angle may be dependent on frictional forces, or lack thereof.

Figure 6:
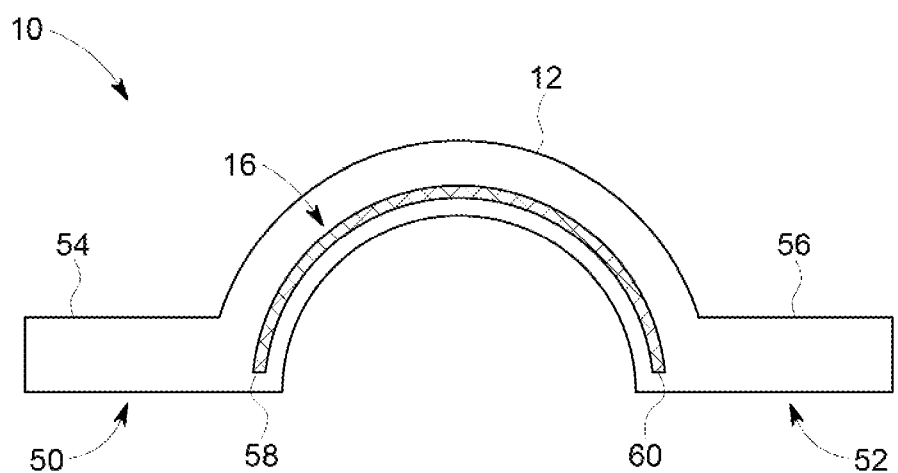
FIG. 6 is a cross sectional view of another exemplary embodiment of a temperature activated sealing device in accordance with the present invention.

Referring to FIG. 6, although described above as having a circular shape, the body 12 and/or mesh 16 may have any shape suitable to accommodate for a desired application. For example, in one embodiment, such as where the seal 10 is utilized as a packer element for a zonal isolation device or blow out preventer (BOP) (e.g., a fixed bore ram, annual packer, variable ram packer (Hydril), or the like), the body 12 and mesh 16 may have an arcuate shape substantially forming a semi-circle, such as shown in FIG. 6. The body 12 includes a first end 50 and a second end 52. A first flange 54 is integrally connected to the first end 50 and a second flange 56 is integrally connected to the second end 52. Flanges 54 and 56 are configured to interface with components of the zonal isolation device or blowout preventer.

The mesh 16 is configured to provide a variable modulus throughout the arcuate portion of the body 12 that would interface with a surface of a pipe, tube, bore, or the like. The mesh 16 is sized such that a first end 58 of the arcuate mesh 16 extends proximate the first end 50 of the arcuate body 12 and a second end 60 of the mesh 16 extends proximate the second end 52 of the body 12.

Figure 7:
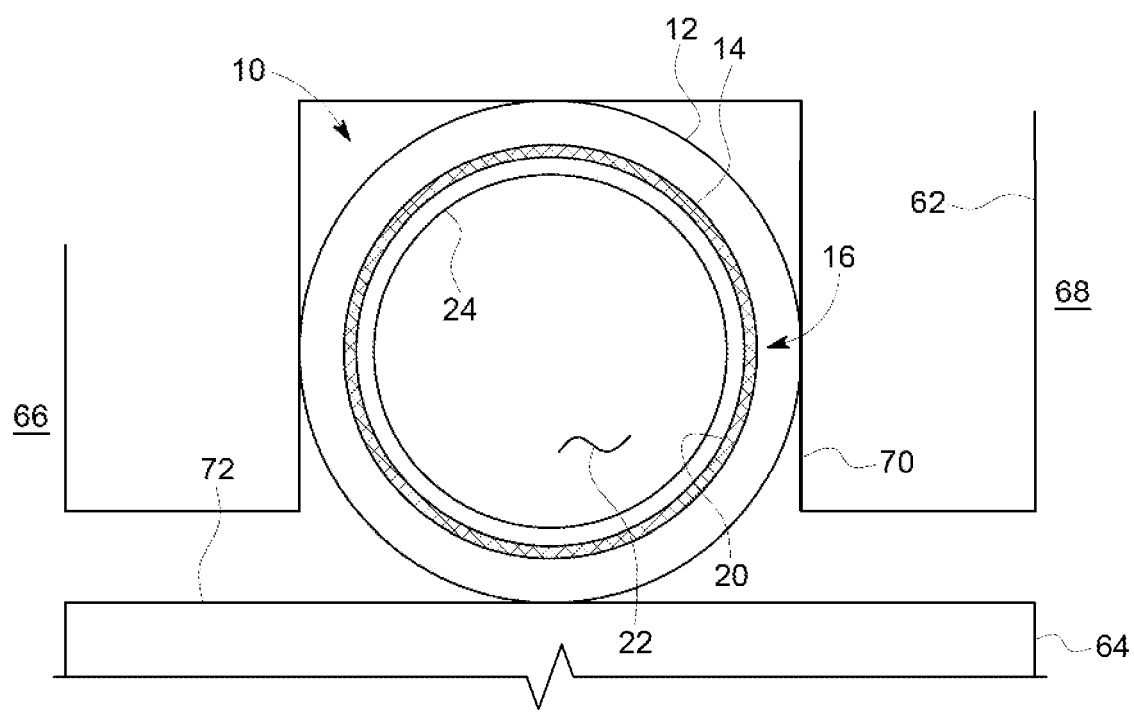
FIG. 7 is a cross sectional view of another exemplary embodiment of a temperature activated sealing device in use in accordance with the present invention.

Referring to FIG. 7, in an exemplary operation of one embodiment of the sealing device 10, the seal 10 may be disposed between a first plate 62 and a second plate 64 to isolate an area of high pressure (a high pressure side 66) from an area of low pressure (a low pressure side 68). In such an embodiment, the seal 10 may be disposed in a channel 70 formed in the first plate 62. In operation, as the pressure in the high pressure side 66 increases above the installation pressure of seal 10, so does the temperature increase above installation temperature of seal 10. Therefore, the pressure and temperature within the inner volume 20 of the mesh 16 also increase, thereby causing at least a portion of the filler 22 to change phase from a liquid to a gas. As the gaseous portion of filler 22 expands and pressurizes the mesh 16, it exerts a radially outward pressure on the seal 10. As a result, seal 10 expands against the channel 70 of the first plate 62 and a surface 72 of the second plate 64. Additionally, the stiffness of the seal 10 is significantly increased as the effective modulus of seal 10 transitions from its first to its second modulus, thus forming a seal between the first plate 62 and the second plate 64.

Even though the exemplary operational embodiment of FIG. 7 includes an elevated operating temperature and pressure above the installation temperature and pressure of seal 10, one skilled in the art would recognize that the operating pressure may not elevate with the operating temperature. For example, it is entirely possible to have a sealing application wherein the operating pressure remains substantially equal to the installation pressure while the operating temperatures elevate substantially above installation temperatures. What is important is that the at least a portion of the filler 22 changes phase from a liquid to a gas at the elevated operating temperatures whether or not the operating pressures also elevate.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope.

While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. .sctn.112, sixth paragraph, unless and until such claim limitations expressly use the phrase "means for" followed by a statement of function void of further structure.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

Additionally, while various embodiments of the invention have been described, it is to be understood that aspects of the present invention may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An elastomeric sealing device operable at an operating temperature above an installation temperature, the sealing device comprising:
    a body fabricated from an elastomeric material, the body having an inner wall;
    a channel formed within the body and defined by the inner wall;
    a mesh disposed within the channel and adjacent the inner wall, the mesh including a plurality of interwoven fibers; and
    a filler comprising thermally expandable micro spheres disposed within the channel, wherein at least a first portion of the filler is a liquid at the installation temperature, and wherein the at least a second portion of the filler is a gas at the operating temperature, wherein the operating temperature is higher than the installation temperature,
    wherein the channel facilitates a phase change of at least a part of the first portion of the filler to at least a part of the second portion of the filler, and thereby facilitates a corresponding increase in a modulus of elasticity of the sealing device.

2. The elastomeric sealing device of claim 1,
    wherein at least the first portion of the filler is a liquid at an installation pressure; and
    at least the first portion of the filler is a gas at an operating pressure.

3. The elastomeric sealing device of claim 1, wherein the operating temperature is within a range of 65 degrees C. to 260 degrees C.

4. The elastomeric sealing device of claim 2, wherein the operating pressure is within a range of 100 psi to 30,000 psi.

5. The elastomeric sealing device of claim 1, wherein the installation temperature is within a range of 0 degrees C. to 25 degrees C.

6. The elastomeric sealing device of claim 2, wherein the installation pressure is substantially equal to the operating pressure.

7. The elastomeric sealing device of claim 1, including an inner liner disposed between the filler and mesh.

8. The elastomeric sealing device of claim 1, wherein the plurality of interwoven fibers includes:
    a first group of fibers arranged at a first angle with respect to a longitudinal axis of the mesh:
    a second group of fibers arranged at a second angle with respect to the longitudinal axis of the mesh, the second angle being substantially opposite and substantially equal to the first angle.

9. The elastomeric sealing device of claim 8, wherein the first angle is within a range of 50 to 60 degrees.

10. The elastomeric sealing device of claim 1, wherein the fibers are inextensible under some conditions.

11. The elastomeric sealing device of claim 1, wherein the elastomeric material is a polymer.

12. The elastomeric sealing device of claim 1, wherein the elastomeric material is a rubber.

13. The elastomeric sealing device of claim 7, wherein the inner liner is fabricated from an elastomeric material.

14. The elastomeric sealing device of claim 1, wherein the body has an annular shape.

15. The elastomeric sealing device of claim 14, wherein the elastomeric sealing device is an o-ring.

16. The elastomeric sealing device of claim 1 wherein the body comprises:
    an arcuate shaped portion having a first end and a second end;
    a first flange integrally connected to the first end; and
    a second flange integrally connected to the second end.

17. The elastomeric sealing device of claim 16 wherein the elastomeric sealing device is a packer element for one of a zonal isolation device and a blow-out preventer.

18. The elastomeric sealing device of claim 17 wherein the first and second flanges are configured to securely affix to one of the zonal isolation device and blow-out preventer.

19. The elastomeric sealing device of claim 1, wherein the modulus of elasticity comprises:
    a first effective modulus attributable to the elastomeric sealing device at the installation temperature; and
    a second effective modulus attributable to the elastomeric sealing device at the operating temperature;
    wherein the second effective modulus is larger magnitude than the first effective modulus.

20. The elastomeric sealing device of claim 19, further comprising:
    the first effective modulus attributable to the elastomeric sealing device at the installation pressure; and
    the second effective modulus attributable to the elastomeric sealing device at the operating pressure.

21. The elastomeric sealing device of claim 18, wherein the second effective modulus is between 2 to 3 orders of magnitude greater than the first effective modulus.

22. The elastomeric sealing device of claim 1, wherein the microspheres comprise:
    a first type of microsphere selected to begin an expansion within a first operating temperature range; and
    a second type of microsphere selected to begin an expansion with a second operating temperature range;
    wherein the second operating temperature range is higher than the first operating temperature range.

23. The elastomeric sealing device of claim 22, wherein the microspheres are comprised of:
    a thermoplastic shell; and
    a hydrocarbon encapsulated by the shell, the hydrocarbon being the at least a portion of the filler that is a liquid at the installation temperature and the installation pressure, and is a gas at the operating temperature and operating pressure.

* * * * *